(12) United States Patent
Dessart et al.

(10) Patent No.: US 12,076,825 B2
(45) Date of Patent: Sep. 3, 2024

(54) WELDING PROCESS WIRE FEEDER ADAPTER INSULATOR

(71) Applicant: ILLINOIS TOOL WORKS INC., Glenview, IL (US)

(72) Inventors: Nicholas James Dessart, Appleton, WI (US); Brian Randall Bellile, Greenville, WI (US); Alan Edward Stein, Little Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 845 days.

(21) Appl. No.: 14/954,295

(22) Filed: Nov. 30, 2015

(65) Prior Publication Data

US 2017/0151622 A1    Jun. 1, 2017

(51) Int. Cl.
*B23K 9/12*     (2006.01)
*B23K 9/133*    (2006.01)
*B23K 9/32*     (2006.01)

(52) U.S. Cl.
CPC ............ *B23K 9/124* (2013.01); *B23K 9/1336* (2013.01); *B23K 9/323* (2013.01)

(58) Field of Classification Search
CPC ....... B23K 9/124; B23K 9/1336; B23K 9/323
USPC .......................................................... 219/74
See application file for complete search history.

(56) References Cited

U.S. PATENT DOCUMENTS

| | | | | |
|---|---|---|---|---|
| 3,529,127 A | * | 9/1970 | Smith .................. | B23K 9/1336 219/137.31 |
| 3,579,432 A | * | 5/1971 | Finnegan .................. | C25C 3/08 204/279 |
| 3,629,547 A | * | 12/1971 | Kester .................... | B23K 9/295 219/120 |
| 3,650,941 A | * | 3/1972 | Finnegan .................. | C25C 3/08 204/247.4 |
| 3,898,419 A | * | 8/1975 | Smith .................. | B23K 9/1336 219/137.7 |
| 4,035,605 A | * | 7/1977 | Taniguchi ............ | B23K 9/0213 219/126 |

(Continued)

FOREIGN PATENT DOCUMENTS

| | | |
|---|---|---|
| AU | 2011100104 | 2/2011 |
| CN | 1894070 | 1/2007 |

(Continued)

OTHER PUBLICATIONS

"75 Series Wire Feed System," Miller Electric Mfg. Co., Jul. 2006, Index No. M/3.5.

(Continued)

*Primary Examiner* — Eric S Stapleton
(74) *Attorney, Agent, or Firm* — McAndrews, Held & Malloy, Ltd.

(57) ABSTRACT

An adapter assembly includes a coupling portion that couples to a gas metal arc welding (GMAW) wire drive assembly and receives electrical current flow from the GMAW wire drive assembly. Additionally, the adapter assembly includes a receiving portion that couples with a connector of a welding cable of a non-GMAW torch to provide the electrical current flow to the non-GMAW torch from the GMAW wire drive assembly. Further, the adapter assembly includes an insulating component that affixes around the receiving portion.

21 Claims, 7 Drawing Sheets

(56) References Cited

U.S. PATENT DOCUMENTS

| | | | | |
|---|---|---|---|---|
| 4,158,763 A * | 6/1979 | Moerke | B23K 9/295 | 219/137.42 |
| 4,187,411 A * | 2/1980 | Bryce | B23K 9/1336 | 219/137.2 |
| 4,487,990 A * | 12/1984 | Lane | H01R 9/11 | 174/15.7 |
| 4,554,433 A * | 11/1985 | Toothaker | B23K 9/323 | 219/137.31 |
| 4,611,111 A * | 9/1986 | Baheti | B23K 9/0956 | 219/124.34 |
| 4,613,743 A * | 9/1986 | Nied | B23K 9/0956 | 219/130.21 |
| 4,617,447 A * | 10/1986 | O'Donohue | B23K 9/0209 | 219/124.31 |
| 4,667,083 A * | 5/1987 | Stol | B23K 9/295 | 219/136 |
| 4,695,702 A * | 9/1987 | Gartland | B23K 9/295 | 219/137.31 |
| 4,757,180 A * | 7/1988 | Kainz | B23K 9/1336 | 219/137.2 |
| 4,762,977 A * | 8/1988 | Browning | B05B 7/224 | 219/121.47 |
| 4,791,270 A * | 12/1988 | Nelson, Jr. | B23K 9/032 | 219/125.1 |
| 4,918,517 A * | 4/1990 | Burgoon | B23K 9/0956 | 348/335 |
| 5,109,150 A * | 4/1992 | Rogers | B05B 7/224 | 219/121.47 |
| 5,132,513 A * | 7/1992 | Ingwersen | B23K 9/295 | 219/137.31 |
| 5,258,599 A * | 11/1993 | Moerke | B23K 9/295 | 219/121.45 |
| 5,260,546 A * | 11/1993 | Ingwersen | B23K 9/295 | 219/137.31 |
| 5,595,671 A * | 1/1997 | David | B23K 9/133 | 219/137.62 |
| 5,728,995 A * | 3/1998 | Kensrue | B23K 9/1333 | 219/137.31 |
| 5,811,055 A * | 9/1998 | Geiger | B23K 9/0061 | 266/48 |
| 5,816,466 A * | 10/1998 | Seufer | B23K 9/1333 | 226/187 |
| 5,994,659 A * | 11/1999 | Offer | B23K 9/1093 | 219/136 |
| 6,066,823 A * | 5/2000 | Lageose | B23K 9/0288 | 219/125.1 |
| 6,225,599 B1 * | 5/2001 | Altekruse | B23K 9/124 | 219/137.31 |
| 6,271,497 B1 * | 8/2001 | Zapletal | H05H 1/34 | 219/121.36 |
| D456,678 S * | 5/2002 | Karten | D8/29.1 | |
| 6,427,894 B1 * | 8/2002 | Blank | B23K 9/1336 | 226/177 |
| 6,437,288 B1 * | 8/2002 | Lefebvre | B23K 9/173 | 219/137 WM |
| 6,568,578 B1 * | 5/2003 | Kensrue | B23K 9/1336 | 219/137.7 |
| 6,649,858 B2 * | 11/2003 | Wakeman | B23K 9/295 | 219/136 |
| 6,740,848 B2 * | 5/2004 | Parker | B23K 9/295 | 219/137.31 |
| 6,998,575 B1 * | 2/2006 | Kensrue | B23K 9/133 | 219/137.31 |
| 7,026,574 B2 * | 4/2006 | Belfiore | B23K 9/124 | 219/137.7 |
| 7,196,284 B2 * | 3/2007 | Barten | B23K 9/295 | 219/137.31 |
| 7,244,909 B2 * | 7/2007 | Kensrue | B23K 9/28 | 219/137.31 |
| 8,878,097 B2 * | 11/2014 | Enyedy | B23K 9/1336 | 219/137.2 |
| 9,073,139 B2 * | 7/2015 | Christopher | B23K 9/1336 | |
| 9,731,385 B2 * | 8/2017 | Miller | B23K 37/0211 | |
| 2002/0071791 A1 * | 6/2002 | Foster | F01N 3/2853 | 422/179 |
| 2002/0150518 A1 * | 10/2002 | Brush | F01N 3/2867 | 422/180 |
| 2003/0015510 A1 * | 1/2003 | Wakeman | B23K 9/295 | 219/137.31 |
| 2003/0062354 A1 * | 4/2003 | Ward | B23K 9/167 | 219/137.71 |
| 2003/0099779 A1 * | 5/2003 | Kley | C23C 4/131 | 427/455 |
| 2003/0209524 A1 * | 11/2003 | Delgado | B23K 9/323 | 219/75 |
| 2003/0209530 A1 * | 11/2003 | Stuart | B23K 9/173 | 219/137.61 |
| 2005/0023263 A1 * | 2/2005 | Blide | B23K 9/295 | 219/132 |
| 2005/0103768 A1 * | 5/2005 | Ward | B23K 9/122 | 219/132 |
| 2006/0219683 A1 * | 10/2006 | Kensrue | B23K 9/28 | 219/137.31 |
| 2007/0017912 A1 * | 1/2007 | Flood | B23K 9/0282 | 219/125.11 |
| 2008/0017622 A1 * | 1/2008 | Stanzel | B23K 9/173 | 219/137.2 |
| 2008/0073330 A1 * | 3/2008 | Diedrick | B23K 9/32 | 219/133 |
| 2012/0211472 A1 * | 8/2012 | Farah | B23K 9/1012 | 219/108 |
| 2012/0211479 A1 * | 8/2012 | Anderson | B23K 9/124 | 219/136 |
| 2013/0327748 A1 * | 12/2013 | Salsich | B23K 9/1087 | 219/130.21 |
| 2013/0334188 A1 * | 12/2013 | Enyedy | B23K 9/095 | 219/130.21 |
| 2014/0166629 A1 * | 6/2014 | Kadlec | B23K 9/287 | 219/121.39 |
| 2014/0166631 A1 * | 6/2014 | Rozmarynowski | B23K 10/00 | 219/121.48 |
| 2015/0126342 A1 * | 5/2015 | Kaye | A63B 21/00069 | 482/121 |
| 2015/0167190 A1 * | 6/2015 | Massaro | C25C 3/14 | 204/279 |
| 2016/0016249 A1 * | 1/2016 | Bellile | B23K 9/173 | 219/130.1 |

FOREIGN PATENT DOCUMENTS

| | | |
|---|---|---|
| CN | 202461771 | 10/2012 |
| CN | 104220206 | 12/2014 |
| CN | 104428096 | 3/2015 |
| EP | 0074430 | 3/1983 |
| WO | 2013142887 | 10/2013 |

OTHER PUBLICATIONS

International Search Report for PCT application No. PCT/US2015/028941, dated Oct. 8, 2015, 10 pgs.

* cited by examiner

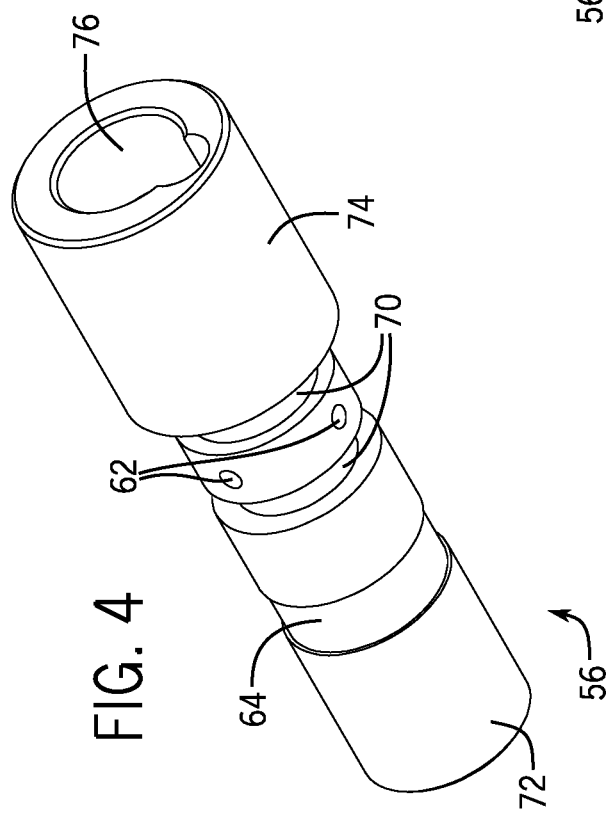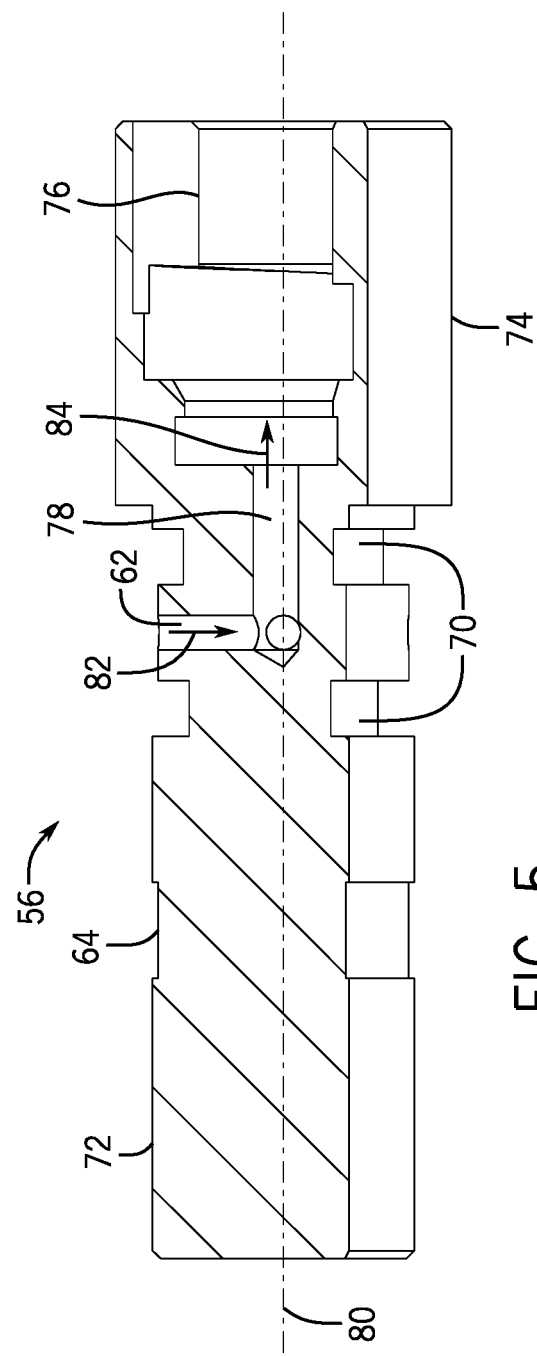

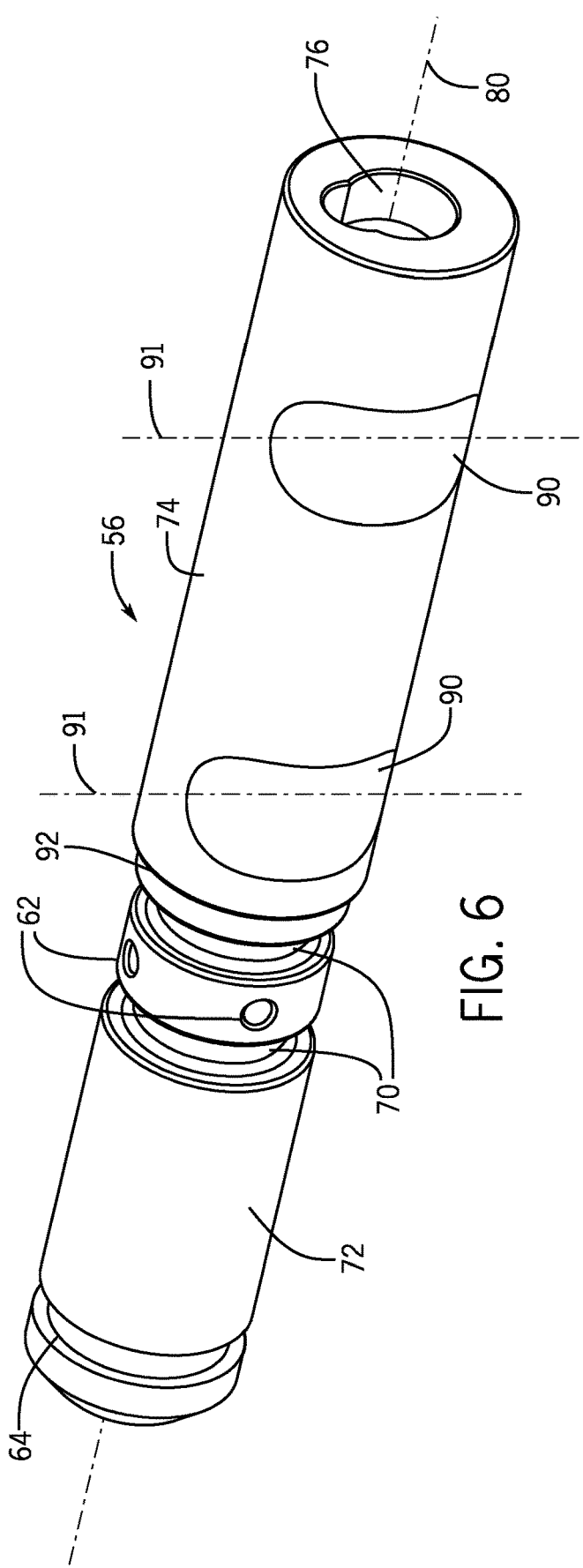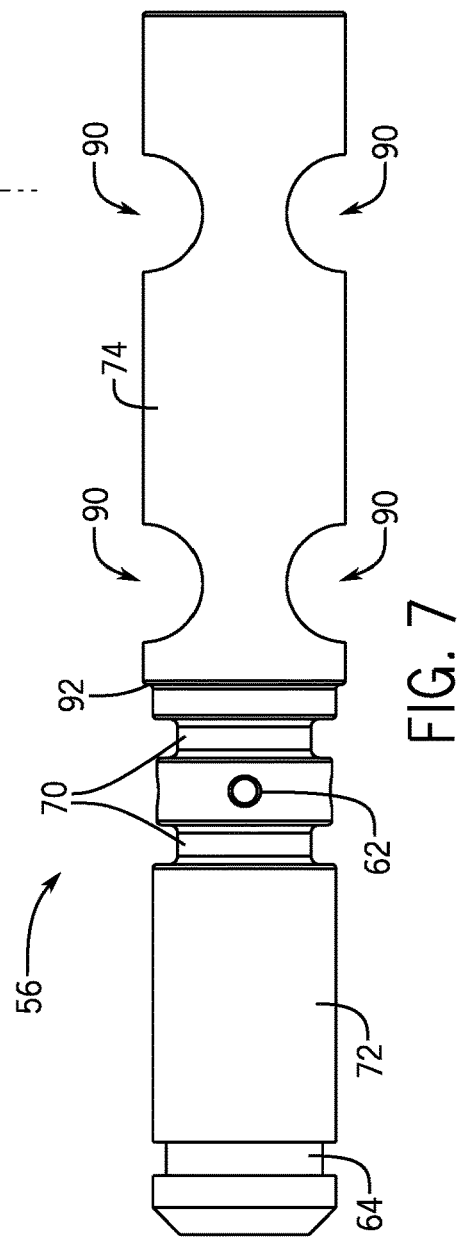

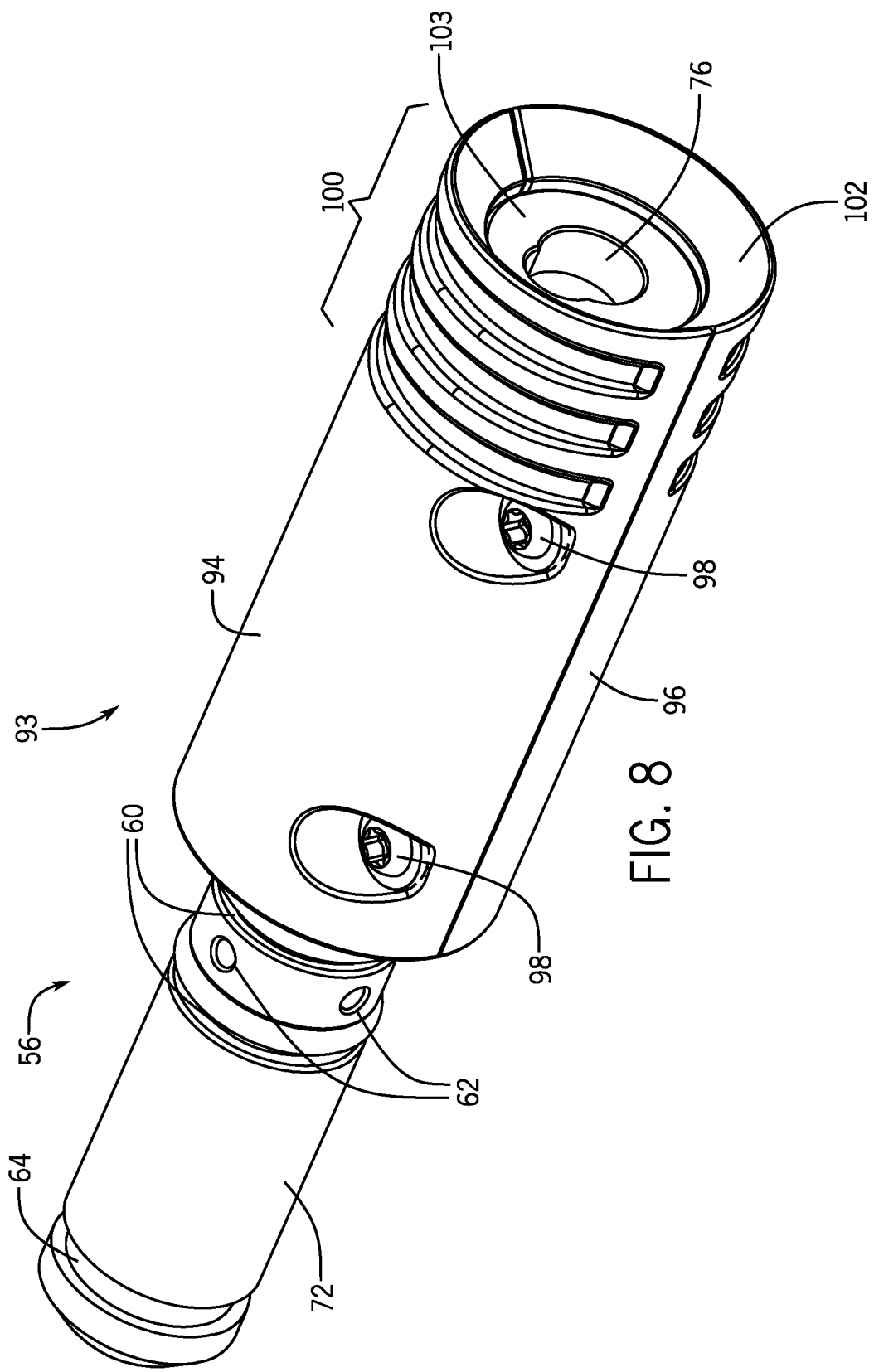

WELDING PROCESS WIRE FEEDER ADAPTER INSULATOR

BACKGROUND

The present disclosure relates generally to welding systems, and, more particularly, to an insulating shell for an adapter that transitions between various welding processes while using a wire feeder to provide power and welding consumables to the various welding processes.

Welding is a process that has increasingly become ubiquitous in various industries and applications. While such processes may be automated in certain contexts, a large number of applications continue to exist for manual welding operations. Such welding operations rely on a variety of types of equipment to ensure that the supply of welding consumables (e.g., wire feed, shielding gas, etc.) provides an appropriate amount of the welding consumables at a desired time to the weld. For example, a gas metal arc welding (GMAW) system typically relies on a wire feeder assembly to ensure a proper wire feed, a proper gas flow, and a stable power supply reach a welding gun, while a gas tungsten metal arc welding (GTAW) system and a plasma welding system typically rely on a power supply assembly to ensure a proper gas flow and a stable power supply reach a welding or a plasma welding torch. Further, a shielded metal arc welding (SMAW) system typically relies on a power supply assembly to ensure a stable power supply reaches a welding torch.

The wire feeder of the GMAW system may generally provide the welding consumables and power from an output of the wire feeder to a GMAW torch or "gun" used to create a GMAW weld. It may be advantageous for the wire feeder to provide a source of gas flow, power, or both, from the output of the wire feeder to a GTAW system and a plasma welding system, and also to provide power from the output of the wire feeder for an SMAW system. However, various welding processes may have incompatible devices that may make sharing a common consumable and power source difficult.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the claimed subject matter. Indeed, the disclosure may encompass a variety of forms that may be similar to or different from the embodiments set forth below.

In a first embodiment, a system includes an adapter that couples to a wire feeder and receives power from a welding power supply. The adapter also provides wire, gas flow, and electrical current flow for a gas metal arc welding (GMAW) process, and the adapter provides the electrical current flow for an alternative welding process. Further, the system includes an insulating shell that electrically insulates a portion of the adapter that is exposed when the adapter is coupled to the wire feeder. Furthermore, the insulating shell includes upper and lower halves.

In a second embodiment, an adapter assembly includes a coupling portion that couples to a gas metal arc welding (GMAW) wire drive assembly and receives electrical current flow from the GMAW wire drive assembly. Additionally, the adapter assembly includes a receiving portion that couples with a connector of a welding cable of a non-GMAW torch to provide the electrical current flow to the non-GMAW torch from the GMAW wire drive assembly. Further, the adapter assembly includes an insulating component that affixes around the receiving portion.

In a third embodiment, an insulating shell includes interchangeable upper and lower halves that provide electrical insulation for a welding process adapter. Additionally, the insulating shell includes at least one fastening device that couples the upper and lower halves together. Further, the upper and lower halves each include at least one fastening device mechanism that couples the upper and lower halves together. The at least one fastening device mechanism fits within at least one anti-rotation groove of the welding process adapter

DRAWINGS

These and other features, aspects, and advantages of the present disclosure will become better understood when the following detailed description is read with reference to the accompanying drawings in which like characters represent like parts throughout the drawings, wherein:

FIG. 4 is a perspective view of an exemplary adapter that enables coupling of the wire feeder of FIG. 1 to the GTAW system, the SMAW system, or the plasma welding system of FIG. 1;

FIG. 5 is a cross-sectional view of the adapter of FIG. 4;

FIG. 6 is a perspective view of an adapter that is configured to mate with an insulating shell to electrically insulate the adapter from an operator or a work piece;

FIG. 7 is a top view of the adapter of FIG. 6;

FIG. 8 is a perspective view of the adapter of FIG. 6 mated with an insulating shell.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to an insulating shell and an adapter for a welding system that may enable various welding processes not requiring a wire feed to function with a welding wire feeder as a power source or a power and gas source. In typical wire feeders, an output may provide welding wire, a gas flow, and power to a gas metal arc welding (GMAW) torch or "gun". Further, in multi-process welding machines, there may be several different connections for the different welding processes that the machine may perform. To increase the versatility of a GMAW wire feeder, an adapter, described in detail below, may be positioned in a wire drive assembly of the wire feeder to provide a power source and a gas source to a gas tungsten arc welding (GTAW) torch or "gun", to provide a power source for a shielded metal arc welding (SMAW) torch or "gun", or to provide a power source for a plasma welding system. Further, an insulating shell may electrically insulate a portion of the adapter protruding from the wire feeder from contact with other conductive elements (e.g., a welding operator or a work piece). Additionally, it may be appreciated that the plasma welding system may include plasma cutting operations in some embodiments. In this manner, multiple welding processes may be accomplished using the individual wire drive assembly of the wire feeder.

Figure 1:
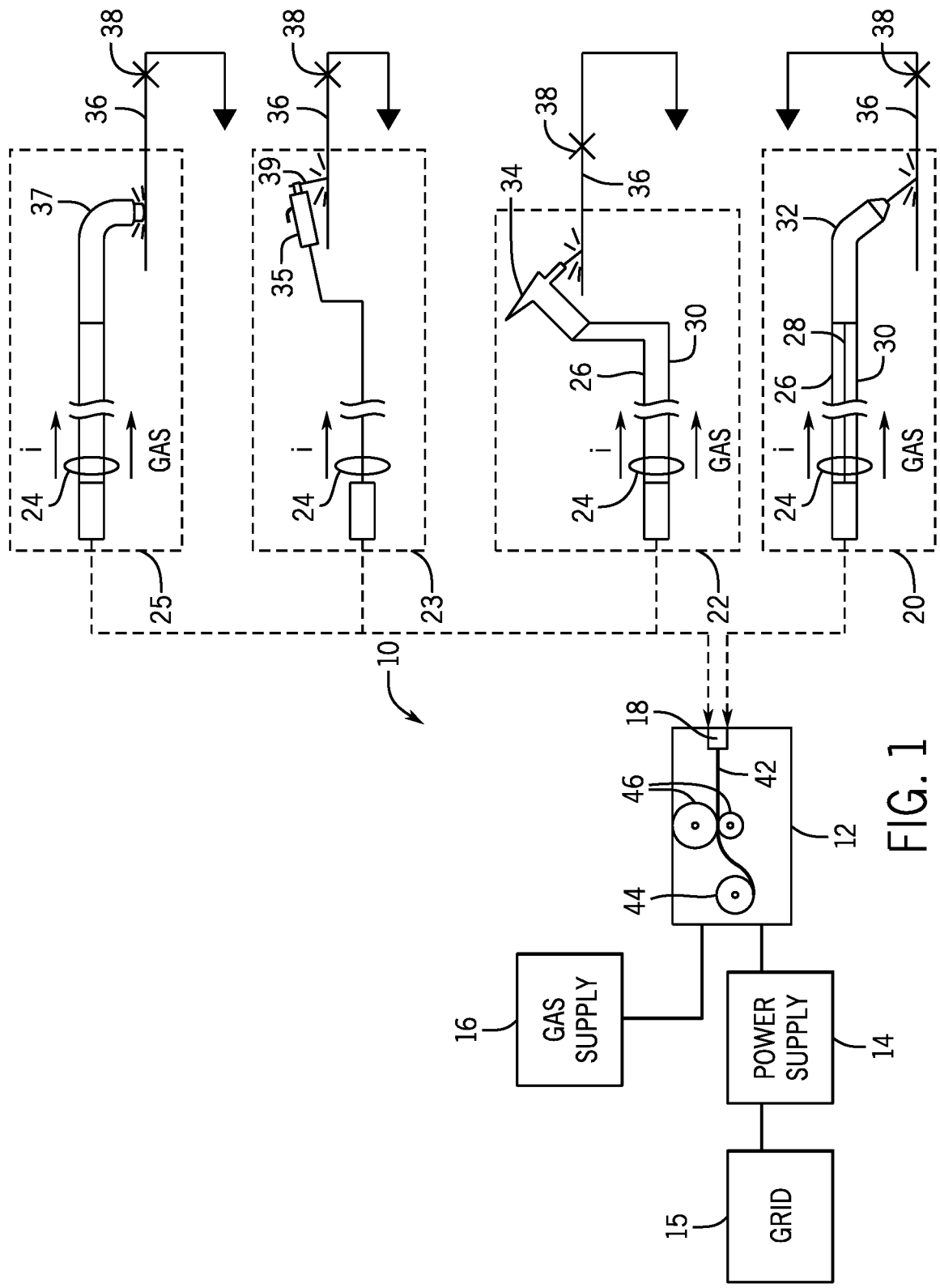
FIG. 1 is a block diagram of an embodiment of an exemplary welding system utilizing a wire feeder with the option of coupling a gas metal arc welding (GMAW) system, a gas tungsten arc welding (GTAW) system, a shielded metal arc welding (SMAW) system, or a plasma welding system to the wire feeder.

FIG. 1 is a block diagram of an embodiment of a welding system 10 in accordance with the present techniques. The welding system 10 may produce a welding arc on a workpiece via a welding gun or a welding torch. The welding arc may be of any type including a GMAW, a GTAW, an SMAW, plasma welding, and so forth. Further, the welding system 10 may include a wire feeder 12 coupled to a power supply 14 and a gas supply 16. The power supply 14 may receive power directly from a grid 15. Additionally, the power supply 14 may receive power from a generator (not shown) capable of providing adequate power to the power supply 14 to power the welding system 10. The gas supply 16 may provide a source of shielding gas to the wire feeder 12. Applying the shielding gas to a weld area on a workpiece may shield a weld from the surrounding atmosphere that may cause imperfections during a welding process. Accordingly, the shielding gas may include an inert or semi-inert gas. Additionally, when a plasma welding system 25 is coupled to the wire feeder 12, the shielding gas may be replaced by compressed air during a plasma welding operation, or the plasma welding system 25 may also continue to use the shielding gas used for other alternative welding operations. Further, the wire feeder 12 may include a wire drive which drives wire from a wire spool toward a weld site during a GMAW operation.

In the present embodiment, a wire drive assembly 18 of the wire feeder 12 may be connected to a GMAW system 20 or alternative welding systems such as a GTAW system 22, an SMAW system 23, or the plasma welding system 25 via welding cables 24. While the GMAW system 20, the GTAW system 22, the SMAW system 23, and the plasma welding system 25 are illustrated in FIG. 1, it should be noted that other welding systems may also be capable of coupling to the wire feeder 12 in a similar manner as the GTAW system 22, the SMAW system 23, or the plasma welding system 25, as discussed below. It should also be noted that the power supply 14 may be capable of supplying power for the GMAW system 20, the GTAW system 22, the SMAW system 23, the plasma welding system 25, or any other compatible welding process.

For the GMAW system 20, the welding cable 24 may supply a current flow 26, wire 28, and a gas flow 30 to a GMAW welding gun 32 from the wire feeder 12. Should the GTAW system 22, the SMAW system 23, or the plasma welding system 25 replace the GMAW system 20, the wire feeder 12 may supply only the current flow 26, the gas flow 30, or both, to a GTAW torch 34, an SMAW electrode holder 35, or a plasma welding torch 37 via the welding cable 24. Therefore, a wire supply system within the wire feeder 12 may be disabled when the GTAW system 22, the SMAW system 23, or the plasma welding system 25 couples to the wire feeder 12. Further, as mentioned above, any other welding process may also be coupled to the wire feeder 12. When the GTAW system 22 is connected to the wire feeder 12, the wire feeder 12 may supply only the current flow 26, only the gas flow 30, or both the current flow 26 and the gas flow 30. Additionally, when the SMAW system 23 is connected to the wire feeder 12, the wire feeder 12 may supply only the current flow 26 due to flux coating a consumable electrode in the SMAW system 23. The flux may create a shielding vapor without the use of the gas supply 16 during an SMAW weld. Therefore, when the SMAW system 23 couples to the wire feeder 12, both the wire drive system and a gas supply system within the wire feeder 12 may be disabled. Further, when the plasma welding system 25 is connected to the wire feeder 12, the wire feeder 12 may supply only the current flow 26, only the gas flow 30, or both the current flow 26 and the gas flow 30.

When either the current flow 26 or the gas flow 30 is disabled during operation of each of the systems 22, 23, and 25, the systems 22, 23, and 25 may receive the current flow 26 or the gas flow 30 from another source. For example, when the current flow 26 is disabled in the wire feeder 12 while the GTAW system 22 is connected to the wire feeder 12, the GTAW system 22 may receive current from an additional power source remote from the wire feeder 12 while the GTAW system 22 receives only the gas flow 30 from the wire feeder 12. Similarly, the plasma welding system 25 may receive current from an additional power source remote from the wire feeder 12 while the plasma welding system 25 receives only the gas flow 30 from the wire feeder 12.

Further, the GMAW system 20, the GTAW system 22, the SMAW system 23, and the plasma welding system 25 may conduct welds or cuts on workpieces 36. During a welding operation or a cutting operation, grounding clamps 38 may clamp to the workpieces 36. The grounding clamps 38, as illustrated, may provide a path to ground for the workpieces 36, and the grounding clamps 38 may also complete a welding or cutting circuit for the GMAW system 20, the GTAW system 22, the SMAW system 23, and/or the plasma welding system 25. By completing the welding circuit, the grounding clamps 38 may enable generation of an arc from the GMAW welding gun 32, the GTAW welding torch 34, an SMAW electrode 39, or the plasma welding torch 37 to the workpieces 36.

Figure 2:
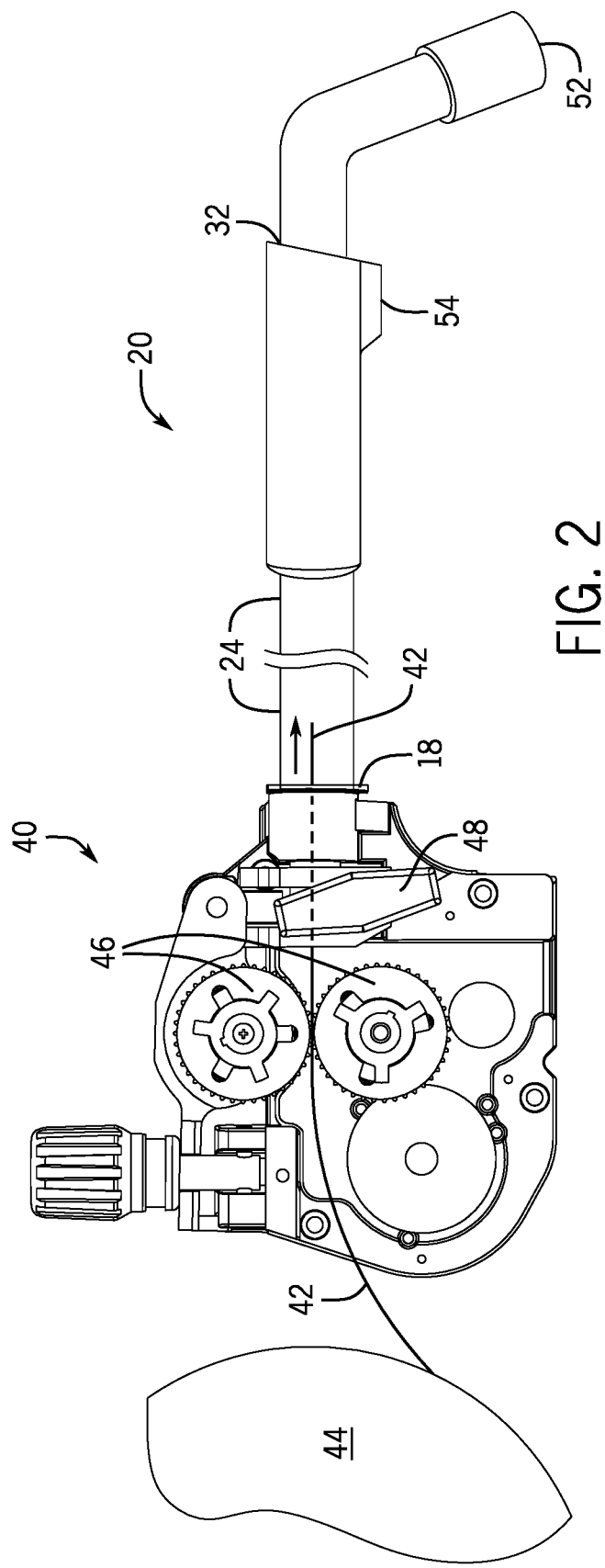
FIG. 2 is a front view of an exemplary embodiment of certain components of the wire feeder of FIG. 1 coupled to the GMAW system of FIG. 1.

Turning now to FIG. 2, a front view of an exemplary embodiment of certain components of the wire feeder 12 coupled to the GMAW system 20 is illustrated. Generally, in the GMAW welding system 20, the wire drive system 40 of the wire feeder 12 may provide a mechanism for feeding the wire 28 toward the GMAW welding gun 32 from a wire spool 44. A feed motor (not shown) within the wire drive system 40 may mechanically couple to the drive wheels 46.

The drive wheels 46, in turn, may drive the wire 28 from the wire feeder 12 toward the GMAW welding gun 32. Further, the welding cable 24 that may provide the current flow 26, the wire 28, and the gas flow 30 to the GMAW welding gun 32 may couple securely to the wire feeder 12 via a tightening screw 48. Furthermore, a wire drive assembly 18 may couple with a machine connector portion of the welding cable 24 at the wire feeder 12. The wire drive assembly 18 may provide a location to receive the machine connector portion of the welding cable 24 at the wire feeder 12 enabling the secure coupling of the welding cable 24 to the wire feeder 12 using the tightening screw 48.

Additionally, the GMAW welding gun 32 may include a nozzle 52 that directs the wire 28 and the gas flow 30 toward the workpiece 36 and facilitates generation of the welding arc from the current flow 26. A trigger 54 on the GMAW welding gun 32 may instruct the wire feeder 12 to supply the current flow 26, the wire 28, and the gas flow 30 to the nozzle 52. In this manner, a welding operator may manipulate operation of the GMAW system 20 to produce a desired weld on the workpiece 36.

Figure 3:
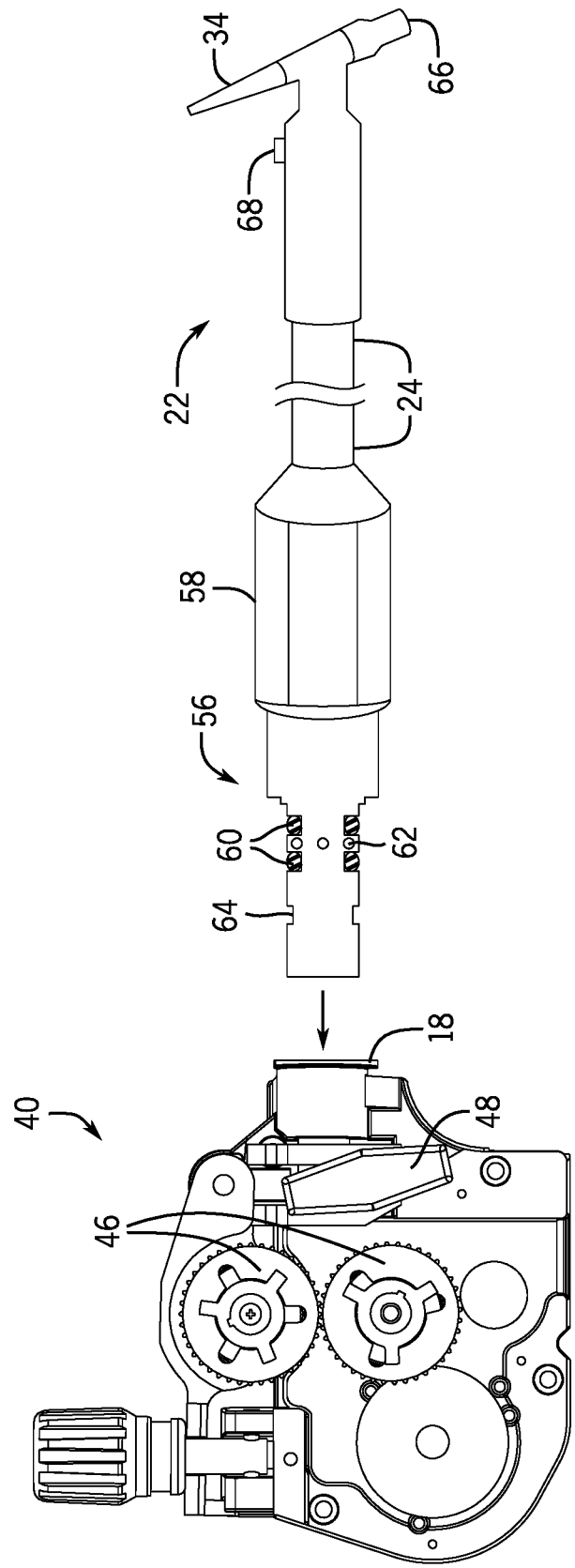
FIG. 3 is a partially exploded front view of an exemplary embodiment of certain components of the wire feeder of FIG. 1 and the GTAW system of FIG. 1.

FIG. 3 is a front view of an exemplary embodiment of certain components of the wire feeder 12 coupled to the GTAW system 22. The GTAW system 22 may couple to the wire feeder 12 at the wire drive assembly 18 via an adapter 56. During operation of the GTAW system 22, the adapter 56 may be positioned in the wire drive assembly 18 and held in place by the tightening screw 48 to create a secure connection between the adapter 56 and the wire feeder 12. An opposite end of the adapter may receive a cable machine connector 58 coupled to the welding cable 24. The cable machine connector 58 may provide similar connection capabilities as a standard cable machine connector for coupling a welding cable to a standard GTAW power source. In this embodiment, only the adapter 56 is used in addition to the cable machine connector 58 when coupling the GTAW system 22 to the wire feeder 12 that typically provides power and expendables (e.g., gas flow 30 and wire 42) to the GMAW system 20.

Additionally, in some embodiments, the adapter 56 may be permanently affixed to a welding cable 24. In such an embodiment, the welding cable 24 may bypass the machine connector 58 and permanently couple with the adapter 56. The resulting adapter 56 and welding cable 24 device may provide a mechanism for a welding operator to efficiently transition between operating the GMAW system 20 and the GTAW system 22. Further, a welding operator welding primarily with the GMAW system 20, and generally having access to only the wire feeder 12 as a power source, may find a lesser burden to perform a weld with the GTAW system 22 when the adapter 56 is permanently affixed to the welding cable 24.

Furthermore, the adapter 56 may be made from a conductive material (e.g., brass, copper, aluminum) to conduct the current flowing from the power supply 14 through the wire feeder 12 and provide the current to the GTAW torch 34 to generate an arc at the workpiece 36. A suitable conductive material may carry a current desired for the GTAW system 22. Therefore, the adapter 56 may generally consist of a metallic material. Further, a single piece of the suitable conductive material may form the adapter 56.

Moreover, the adapter 56 may include o-rings (or other suitable sealed connectors) 60 positioned on the body of the adapter. The o-rings 60 positioned on one or both sides of gas through-ports 62 may prevent shielding gas leakage from the gas supply 16 as the shielding gas flows through the wire drive assembly 18 toward the GTAW torch 34. Preventing the shielding gas leakage may heighten the gas flow and reduce consumables cost during a welding operation. Further, a recess 64 that encircles the adapter 56 may provide stability for the adapter 56. The tightening screw 48 may interact with the recess 64 during tightening of the tightening screw 48. With this interaction, the tightening screw 48 may secure the adapter 56 in a position coupled to the wire drive assembly 50. Upon tightening the tightening screw 48, the screw may fit within the recess 64 and apply pressure against an inner surface of the recess 64. The applied pressure may render the adapter 56 substantially secure within the wire drive assembly 18. In the illustrated embodiment, the recess 64 encircles the entire adapter 56. However, it may be appreciated that in some embodiments the recess 64 may be a single location on the adapter 56 that receives the tightening screw 48. In this situation, the recess 64 may be designed to couple with specific wire drive assemblies 50 or tightening screws 48.

Upon coupling the welding cable 24 to the power supply 14 via the wire feeder 12, the GTAW torch 34 may operate in a desired manner. For example, the adapter 56 may electrically couple with the wire drive assembly 18 to provide adequate power through the welding cable 24 and toward a nozzle 66. The power supplied at the nozzle 66 may enable arcing at the work piece interacting with a filler rod to create a desired weld bead. Further, shielding gas may flow from the gas supply 16 to the GTAW torch 34 via a gas output of the wire drive assembly 18. The shielding gas may flow from the gas output, through the gas through-ports 62 of the adapter 56 into the welding cable 24, and, ultimately, out of the nozzle 66 to shield the weld produced by the GTAW torch 34. The adapter 56 may contain one or more of the gas through-ports 62 to help facilitate the gas flow from the wire feeder 12 to a GTAW torch 34. Furthermore, the GTAW torch 34 may have a trigger 68 or a pedal (not shown) to control the current flow and the gas flow through the torch and toward the workpiece 36. In this manner, a welding operator may adjust welding parameters output by the wire feeder 12 in a similar manner to a traditional GTAW power and gas source.

Further, to couple the adapter 56 to the wire drive assembly 18, a machine connector portion of the welding cable 24 of the GMAW system 20 may first be removed from the wire drive assembly 18 by loosening the tightening screw 48 and pulling the welding cable 24 away from the wire drive assembly 18. Subsequently, the wire drive assembly 18 may receive the adapter 56 with or without the machine connector 58 already coupled to the adapter 56. Once the adapter 56 is in place, the tightening screw 48 may securely hold the adapter 56 in position within the wire drive assembly 18. Additionally, it may be appreciated that while FIG. 3 depicts the GTAW system 22 coupled to the adapter 56, the adapter 56 may similarly couple the SMAW system 23 or the plasma welding system 25 to the wire feeder 12 to provide the current flow 26, the gas flow 30, or both, to the SMAW system 23 or the plasma welding system 25.

FIG. 4 is a perspective view of the adapter 56. In the illustrated embodiment of the adapter 56, o-ring recesses 70 are shown on either side of the gas through-ports 62. The o-ring recesses 70 may be formed in the body of the adapter 56 to secure positioning of the o-rings 60 shown in FIG. 4. By inserting the o-rings 60 into the o-ring recesses 70, the o-rings 60 may remain substantially stationary when inserting or removing the adapter 56 from the wire drive assembly 18. In this manner, the o-rings 60 may maintain a seal between the adapter 56 and the gas output of the wire drive assembly 18 to prevent any substantial leakage of the shielding gas. As mentioned above, this may reduce costs associated with welding consumables during a welding operation.

Additionally, the adapter 56, as illustrated in FIG. 4, has a coupling portion 72 that may comprise a solid portion of the conductive material that makes up the adapter 56. The coupling portion 72 may have a generally cylindrical shape and function as a male configuration of a size that would enable a close fit within walls of the wire drive assembly 18. Contact between the wire drive assembly 18 and the coupling portion 72 may result in the efficient transfer of current from the wire feeder 12 to the GTAW system 22. Additionally, to enhance contact between the wire drive assembly 18 and the coupling portion 72, the recess 64 may receive the tightening screw 48 to press the adapter 56 into the walls of the wire drive assembly 18 and enhance a secure electrical connection between the wire drive assembly 18 and the coupling portion 72.

Upon establishing the secure electrical connection between the wire drive assembly 18 and the coupling portion 72, the electrical current and the gas flow may travel toward a receiving portion 74 of the adapter 56. The receiving portion 74 may generally comprise a larger diameter than the coupling portion 72 and also comprise a female configuration via a receiving aperture 76. Further, the receiving aperture 76 positioned within the receiving portion 74 may receive the machine connector 58. The machine connector 58 may couple the adapter to the welding cable 24 to transmit the current and gas flow toward the GTAW torch 34. It may be appreciated that while the adapter 56 is described as having a male configuration that couples with the wire drive assembly 18 and a female configuration that couples to the machine connector 58, in some embodiments, the adapter 56 may include a female configuration that couples with the wire drive assembly 18 and a male configuration that couples with the machine connector 58.

Further, as mentioned above, the receiving portion 74 may also remain permanently affixed directly to the welding cable 24. In this embodiment, the welding cable 24 may functionally operate as the receiving portion 74 of the adapter 56. Instead of coupling the machine connector 58 to the receiving portion 74, the GTAW torch 34 may couple directly to the receiving portion 74 of the adapter 56. This embodiment may enable an increase in efficiency in transitioning between the GMAW system 20 and the GTAW system 22 by eliminating a step to couple the welding cable 24 to the machine connector 48. Further, such an embodiment may be attractive to a welding operator that only owns a GMAW welding machine and has little need for the welding cable 24 capable of coupling to a GTAW welding machine.

FIG. 5 is a cross-sectional view of the adapter 56. In the illustrated embodiment, the receiving aperture 76 is in fluid communication with the gas through-ports 62 by way of an inner gas flow path 78. The gas through-ports 62, in the illustrated embodiment, are positioned radially in relation to a central axis 80 of the adapter 56. It may be noted, however, that the gas through-ports 62 may also intersect the central axis 80 at a non-perpendicular angle so long as resulting angle does not impede the gas flow. Further, the inner gas flow path 78, in the present embodiment, is positioned along the central axis 80 within the adapter 56. Similarly to the gas through-ports 62, the inner gas flow path 78 may also be placed within the adapter 56 at any angle relative to the central axis 80 (i.e., not simply parallel to the central axis 80) of the adapter 56 so long as a resulting position of the inner gas flow path 78 does not impede the gas flow.

Further, as illustrated in FIG. 5, arrows 82 and 84 represent the flow direction of the gas from the wire drive assembly 18 toward the welding cable 24. The shielding gas may flow from the wire drive assembly 18 through the gas through-ports 62 in the direction of arrow 82 toward the central axis 80. Upon reaching the inner gas flow path 78, the shielding gas may flow along the central axis 80 in the direction of arrow 84 toward the receiving aperture 76. The shielding gas may then flow into the welding cable 24 before the GTAW torch 34 applies the shielding gas at the site of a weld.

Additionally, in some embodiments, the gas through-ports 62 and the inner gas flow path 78 may not be present. Such an embodiment may be used with an SMAW system or any other welding system that may not use shielding gas from the gas supply 16. For example, in the SMAW system, the flux coating the consumable electrode creates the shielding gas during welding. Because of this, the SMAW torch does not provide the shielding gas during a weld. This may result in disabling both the gas source 16 and the wire drive system 40 while the SMAW system is in place. Further, coupling the SMAW system to the wire drive assembly 18 may allow the adapter 56 to operate without the gas through-ports 62 and the inner gas flow path 78. Instead, the adapter 56 may comprise a single, solid piece of brass or other conductive material throughout with a recess for the receiving aperture 76.

In another embodiment, FIG. 6 is a perspective view of the adapter 56 that is configured to mate with an insulating shell to electrically insulate the adapter 56 from an operator or the work piece 36. The adapter 56 may include one or more anti-rotation grooves 90. The anti-rotation grooves 90 may interact with portions of the insulating shell to prevent rotation of the insulating shell about the adapter 56. Further, in certain embodiments, the anti-rotation grooves 90 may be arranged on opposite sides of the adapter 56. In this manner, a top half of the insulating shell and a bottom half of the insulating shell may be interchangeable, as discussed in detail below in the descriptions of FIGS. 8 and 9. In certain embodiments, the anti-rotation grooves 90 may comprise semicircular grooves with groove axes 91 that are orthogonal to, and offset from, the central axis 80 of the adapter 56.

Additionally, as depicted, the adapter 56 may include a mating groove 92 that facilitates positioning and securement of the insulating shell about the adapter 56. For example, an end of the insulating shell may fit between a body of the wire feeder 12 and the receiving portion 74 of the adapter 56. Accordingly, the mating groove 92 may provide a shoulder upon which the insulating shell securely couples to the adapter 56.

FIG. 7 is a top view of the adapter 56 depicted in FIG. 6. The top view of the adapter 56 depicts four of the anti-rotation grooves 90 (e.g., two anti-rotation grooves 90 on each of two opposite sides of the adapter 56). As mentioned above, positioning the anti-retention grooves 90 symmetrically on two sides of the adapter 56 may enable a top half and a bottom half of the insulating shell to be symmetrical and/or interchangeable while the insulating shell is mated with the adapter 56. Further, the anti-rotation grooves 90 may be positioned in such a way that the anti-rotation grooves 90 do not encroach on the gas flow path 78 or the receiving aperture 76 of the adapter 56. In this manner, the gas flow and coupling mechanics of the adapter 56 may be unchanged from other embodiments of the adapter 56 described in detail above.

Turning now to FIG. 8, a perspective view of the adapter 56 of FIG. 6 mated with an insulating shell 93 is depicted.

The insulating shell 93 may include an upper portion 94 and a lower portion 96. The upper portion 94 and the lower portion 96 may be symmetrical, and the upper portion 94 and the lower portion 96 may also be interchangeable. That is, the upper portion 94 may be installed on a lower side of the adapter 56 and the lower portion 96 may be installed on the upper side of the adapter 56 in addition to installing them as depicted in FIG. 8. Further, in some embodiments, the upper portion 94 and the lower portion 96 may be cast from the same mold. For example, the upper portion 94 and the lower portion 96 may be substantially similar such that only one component is manufactured, and an orientation of the one component (i.e., whether the component is above or below the adapter 56) determines whether the one component is the upper portion 94 or the lower portion 96. Furthermore, substantially similar may be defined in the present specification as two objects that differ structurally by less than 5 percent with respect to any particular dimension.

Additionally, the upper portion 94 and the lower portion 96 may be coupled to each other via one or more fastening devices 98. In certain embodiments, the upper portion 94 and the lower portion 96 receive four of the fastening devices 98 (e.g., two fastening devices 98 on either side) of the insulating shell 93 to couple the upper portion 94 and the lower portion 96 together. In coupling the upper portion 94 and the lower portion 96 together, the insulating shell 93 is secured to the adapter 56.

Further, in certain embodiments, the insulating shell 93 may also include friction grooves 100 molded or machined into the upper portion 94, the lower portion 96, or both. The friction grooves 100 may break up a smooth surface of the insulating shell 93 to provide a location along the insulating shell 93 for an operator to grasp when installing or removing the adapter 56 (and the insulating shell 93) to or from the wire feeder 12. For example, the friction grooves 100 generate friction between the insulating shell 93 and, for example, a hand of the operator when installing or removing the adapter 56.

Moreover, the insulating shell 93 includes a tapered section 102 that surrounds the receiving aperture 76 of the adapter 56. The tapered section 102 may enable the insulating shell 93 to extend beyond an end 103 of the adapter 56 while maintaining accessibility to the receiving aperture 76 of the adapter 56. Accordingly, the tapered section 102 may extend insulating functions of the insulating shell 93 beyond a geometry of the adapter 56, and the tapered section 102 may facilitate reception of the welding cable 24 within the receiving aperture 76 by providing a funneling effect to the end 103 of the adapter 56 for the welding cable 24.

It may be appreciated that the insulating shell 93 may be made from a thermoplastic material, a thermopolymer material, or any other suitable insulative material. Therefore, the insulating shell 93 may electrically isolate the adapter 56 from a welding operator. Further, the insulating shell 93 may also electrically isolate the adapter 56 from the work piece 36 to prevent arcing from the adapter 56 to the work piece 36. It may also be appreciated that the insulating shell 93 may be installed about the adapter 56 prior to installing the adapter 56 within the wire feeder 12, or the insulating shell 93 may be installed about the adapter 56 after the adapter 56 has already been installed within the wire feeder 12. Further, the weld cable 24 may be installed within the adapter 56 prior to installing the adapter 56 within the wire feeder 12 or after installing the adapter 56 within the wire feeder 12. Additionally, the weld cable 24 may be installed within the adapter 56 after installing the insulating shell 93 about the adapter 56 or prior to installing the insulating shell 93 about the adapter 56.

Figure 9:
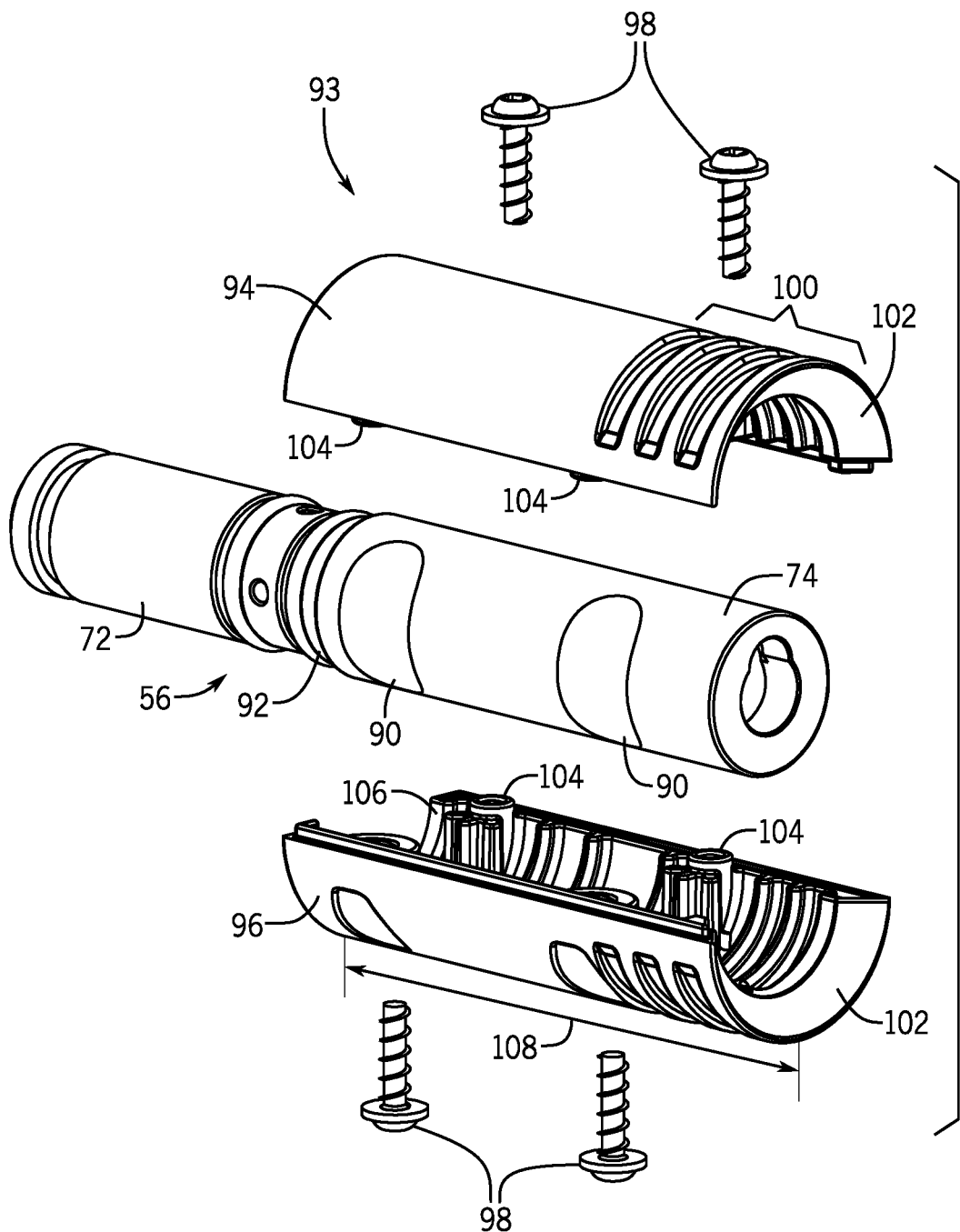
FIG. 9 is an exploded view of the adapter of FIG. 6 and the insulating shell of FIG. 8.

FIG. 9 is an exploded view of the adapter 56 and the insulating shell 93. An interior of the insulating shell 93 includes fastening device receptors 104. As depicted in the illustrated embodiment, two of the fastening devices 98 may be installed through the upper portion 94 and into the fastening device receptors 104 of the lower portion 96. Similarly, in the illustrated embodiment, two of the fastening devices 98 may also be installed through the lower portion 94 and into the fastening device receptors 104 of the upper portion 94. Additionally, the fastening device receptors 104 may fit within the anti-rotation grooves 90 of the adapter 56. Interaction between the anti-rotation grooves 90 and the fastening device receptors 104 may prevent the insulating shell 93 from rotating about the adapter 56.

Additionally, the fastening devices 98 may be screws, rivets, or any other fastening device that is capable of fastening the upper portion 94 to the lower portion 96 of the insulating shell 93. Additionally, the fastening device receptors 104 and the fastening devices 98 may be replaced with a snap feature between the upper portion 94 and the lower portion 96 of the insulating shell 93, or the upper portion 94 and the lower portion 96 may be coupled to each other via ultra-sonic welding or epoxy bonding. Further, the fastening devices 98 may be made from thermoplastics, thermopolymers, or any other suitable insulative material. Furthermore, in some embodiments, the fastening devices 98 may also be made from conductive materials, such as conductive metals. Because the fastening device receptors 104 are made from insulative materials, the fastening device receptors 104 receive the fastening devices 98 and electrically isolate the fastening devices 98 from the adapter 56. In this manner, the fastening devices 98 may be made from any material while maintaining electrical isolation from the adapter 56. It may also be appreciated that the fastening devices 98 may permanently affix the insulating shell 93 to the receiving portion 74 of the adapter 56, or the fastening devices 98 may removably affix the insulating shell 93 to the receiving portion 74 of the adapter 56.

Further, the lower portion 96 depicts a mating ridge 106 that mates with the mating groove 92 of the adapter 56. The mating ridge 106 may extend into the mating groove 92 of the adapter 56 to help facilitate coupling the insulating shell 93 to the adapter 56. For example, as the adapter 56 is removed from the wire feeder 12, the mating ridge 106 of the adapter 56 may interact with the mating groove 92 in such a manner that a force exerted on the insulating shell 93 in a direction away from the wire feeder 12 will also exert the force on the adapter 56 in a direction away from the wire feeder 12. Further, along with the interaction between the anti-rotation grooves 90 and the fastening device receptors 104, the interaction between the mating groove 92 of the adapter 56 and the mating ridge 106 of the upper and lower portions 94, 96 may aid in keeping the insulating shell 93 in a stationary position about the adapter 56. It may be appreciated that while the mating ridge 106 is only visible in FIG. 9 on the lower portion 96 of the insulating shell 93, the mating ridge 106 is also present on the upper portion 94 of the insulating shell 93.

Moreover, to facilitate installing and/or removing the adapter 56 to and/or from the wire feeder 12, the insulating shell 93 and the adapter 56 may protrude a length 108 from the wire feeder 12 while the adapter 56 is installed in the wire feeder 12. In certain embodiments, the length 108 may be between approximately 1 and 2 inches. However, in some instances, the length 108 may be less than 1 inch, or the length 108 may also be greater than 2 inches. For example, the length 108 may be approximately 0.125 inches, 0.25 inches, or 0.5 inches, or the length 108 may be between approximately 2 and 5 inches. Further, the term "approximately" may be defined in this specification as any value within 10 percent of the approximate value. Due to the length 108 of the insulating shell 93, along with the friction grooves 100, an operator may grasp the insulating shell 93 with a relatively small radially inward force when removing or installing the adapter 56.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   an adapter configured to physically and electrically couple at least one of a gas tungsten arc welding (GTAW) torch, a shielded metal arc welding (SMAW) torch, or a plasma cutting torch to an output of a wire feeder that is configured to receive power from a welding power supply and provide wire, gas flow, and electrical current flow for a gas metal arc welding (GMAW) process, the adapter comprising:
   a receiving portion on a first side of the adapter and configured to couple to a machine connector of a cable of a welding torch configured to perform at least one of a GTAW process, an SMAW process, or a plasma process;
   a coupling portion on a second side of the adapter and opposite the receiving portion and configured to:
      couple to the wire feeder; and
      conduct the electrical current from the wire feeder to the welding torch via the receiving portion, wherein the coupling portion is a different connector than the machine connector of the cable of the welding torch; and
   an insulating shell configured to electrically insulate a portion of the adapter that is exposed when the adapter is coupled to the wire feeder, wherein the insulating shell comprises upper and lower halves.

2. The system of claim 1, wherein the upper and lower halves of the insulating shell are interchangeable.

3. The system of claim 1, wherein the adapter comprises anti-rotation grooves configured to prevent rotation of the insulating shell about the adapter.

4. The system of claim 3, wherein the upper and lower halves of the insulating shell each comprise at least one fastening device configured to interact with the anti-rotation grooves of the adapter to prevent rotation of the insulating shell about the adapter.

5. The system of claim 4, wherein the upper half of the insulating shell fastens to the lower half of the insulating shell using the at least one fastening device.

6. The system of claim 4, wherein the at least one fastening device comprises screws that are removable from the upper and lower halves of the insulating shell.

7. The system of claim 1, wherein the adapter comprises a conductive material, and the insulating shell comprises in insulative material.

8. The system of claim 1, wherein the insulating shell extends away from the wire feeder by at least 0.125 inches when the adapter is coupled to the wire feeder.

9. An adapter assembly, comprising:
   a coupling portion on a first end of the adapter assembly, the coupling portion configured to couple to a gas metal arc welding (GMAW) wire drive assembly and to receive electrical current flow from the GMAW wire drive assembly;
   a receiving portion on a second end of the adapter assembly opposite the coupling portion and configured to detachably couple to a connector of a welding cable of a GTAW torch, a SMAW torch, or a plasma cutting torch to provide the electrical current flow to the GTAW torch, the SMAW torch, or the plasma cutting torch from the GMAW wire drive assembly, wherein the coupling portion is a different connector than the connector of the welding cable of the GTAW torch, the SMAW torch, or the plasma cutting torch; and
   an insulating component configured to be affixed around the receiving portion.

10. The adapter assembly of claim 9, wherein the insulating component is permanently affixed around the receiving portion.

11. The adapter assembly of claim 9, wherein the insulating component is configured to be removably affixed around the receiving portion.

12. The adapter assembly of claim 9, wherein the insulating component comprises at least one friction groove.

13. The adapter assembly of claim 9, wherein the receiving portion comprises an anti-rotation groove, wherein the insulating component interacts with the anti-rotation groove to prevent rotation of the insulating component about the receiving portion.

14. The adapter assembly of claim 9, wherein the insulating component comprises a tapered section surrounding a receiving aperture of the receiving portion, and wherein the tapered section is configured to facilitate coupling a welding cable to the receiving portion.

15. The adapter assembly of claim 9, wherein the coupling portion is configured to receive gas flow from the GMAW wire drive assembly, and the receiving portion is configured to provide the gas flow to the non-GMAW torch.

16. An insulating shell, comprising:
   upper and lower halves configured to provide electrical insulation for a welding process adapter between a first end of the welding process adapter and a second end of the welding process adapter attached to at least one of a GTAW torch, an SMAW torch, or a plasma cutting torch, wherein the second end of the welding process adapter comprises a first type of connector and the first end of the welding process adapter is configured to mechanically and electrically couple to a second type of connector different than the first type of connector; and
   at least one fastening device configured to couple the upper and lower halves together;
   wherein the upper and lower halves each comprise at least one fastening device configured to couple the upper and lower halves together,
   wherein the upper and lower halves are interchangeable with each other, and
   wherein the at least one fastening device is configured to fit within at least one anti-rotation groove of the welding process adapter.

17. The insulating shell of claim 16, wherein the upper and lower halves each comprise at least one friction groove configured to facilitate removal of the welding process adapter from a wire feeder.

18. The insulating shell of claim 16, wherein the upper and lower halves each comprise a mating ridge configured to interact with a mating groove of the welding process adapter to at least partially secure the upper and lower halves about a receiving portion of the welding process adapter.

19. The insulating shell of claim 16, wherein the at least one fastening device comprises a screw, a rivet, a snap feature, an ultra-sonic weld, or an epoxy bond.

20. The insulating shell of claim 16, wherein the upper and lower halves each comprise a tapered section configured to facilitate securement of a welding cable to the welding process adapter.

21. The system of claim 1, wherein the coupling portion is configured to electrically and mechanically connect to a wire feed assembly of the wire feeder.

\* \* \* \* \*